United States Patent
Robertson et al.

(10) Patent No.: US 8,356,362 B1
(45) Date of Patent: Jan. 22, 2013

(54) ARM ACCESSORY DEVICE FOR HOLDING REMOTE CONTROLS

(76) Inventors: Tim Robertson, Tinley Park, IL (US); Kelly Robertson, Tinley Park, IL (US)

(\*) Notice: Subject to any disclaimer, the term of this patent is extended or adjusted under 35 U.S.C. 154(b) by 0 days.

(21) Appl. No.: 13/151,791

(22) Filed: Jun. 2, 2011

(51) Int. Cl.
*A41D 13/00* (2006.01)

(52) U.S. Cl. .................................................. 2/16

(58) Field of Classification Search ............. 2/159, 158, 2/16, 19, 161.1, 160, 162, 20
See application file for complete search history.

(56) References Cited

U.S. PATENT DOCUMENTS

| | | | |
|---|---|---|---|
| 4,414,692 A | 11/1983 | Dxierson et al. | |
| 4,497,073 A * | 2/1985 | Deutsch | 2/20 |
| 5,038,144 A | 8/1991 | Kaye | |
| 5,309,328 A | 5/1994 | Lum | |
| D374,767 S | 10/1996 | Leach | |
| 5,604,931 A * | 2/1997 | Rhoades | 2/16 |
| 6,199,211 B1 * | 3/2001 | Franzolino | 2/161.6 |
| 6,473,023 B1 | 10/2002 | Takagi et al. | |
| 6,536,050 B1 * | 3/2003 | Hill | 2/161.6 |
| 7,334,711 B1 | 2/2008 | Winters | |
| 7,578,004 B2 * | 8/2009 | Loyens et al. | 2/16 |
| 2002/0171559 A1 | 11/2002 | Yang | |
| 2004/0226075 A1 | 11/2004 | Marchal | |
| 2007/0083979 A1 | 4/2007 | Daniels | |
| 2008/0084390 A1 | 4/2008 | Jones | |

\* cited by examiner

*Primary Examiner* — Tejash Patel

(57) ABSTRACT

An arm accessory having a glove base with an extension panel connected to the glove base where the extension panel is adapted to cover a portion of an anterior side of the user's forearm with a securing means on the extension panel which functions to secure the extension panel to the user's forearm and having a pocket which has an opening and a closing means on the extension panel.

2 Claims, 3 Drawing Sheets

(In-use View in)

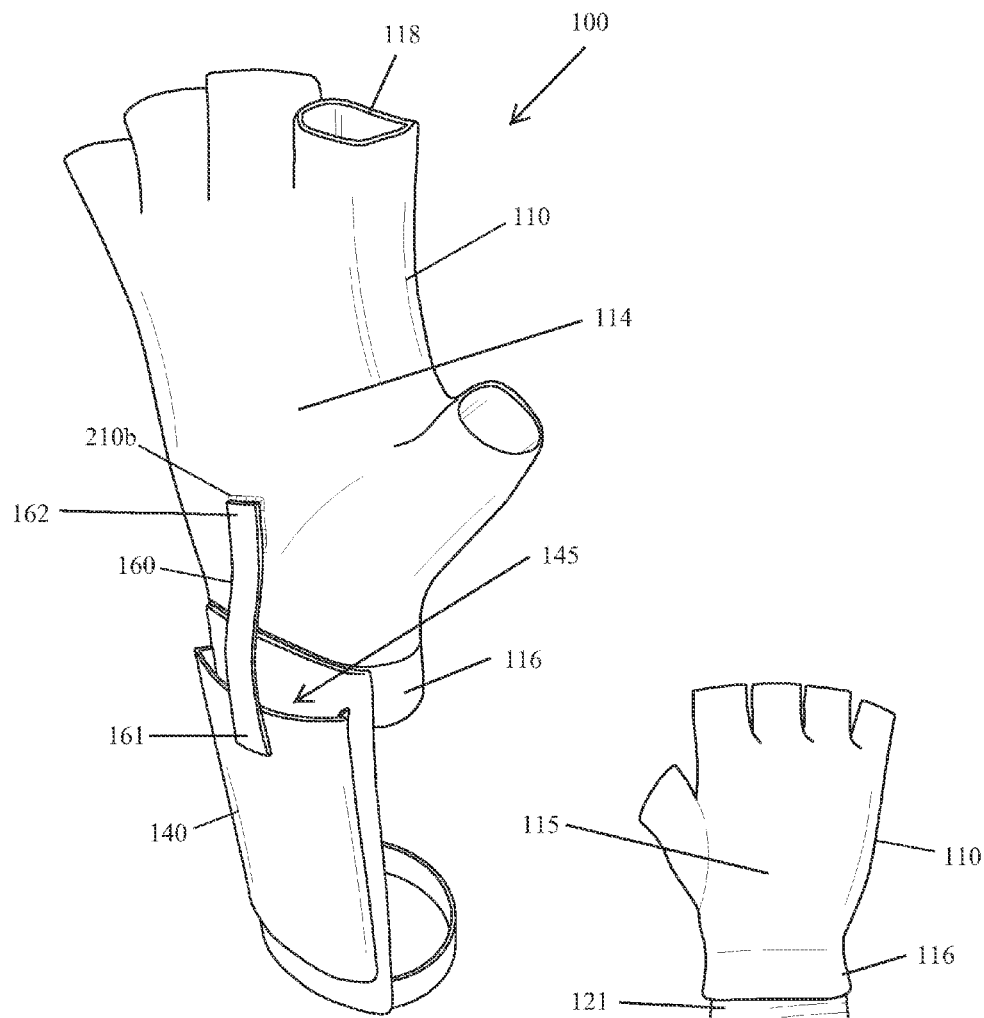
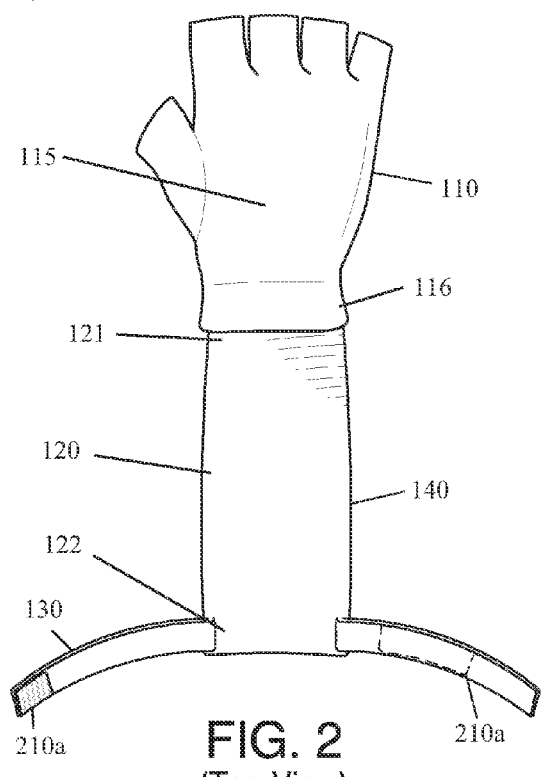
FIG. 1
(ISO View)
FIG. 2
(Top View)

(In-use View out)

(In-use View in)

(Alternative Embodiment)

US 8,356,362 B1

ARM ACCESSORY DEVICE FOR HOLDING REMOTE CONTROLS

FIELD OF THE INVENTION

The present invention is directed to a wearable accessory, more particularly to an accessory that attaches to a user's arm and is designed for holding a remote control.

BACKGROUND OF THE INVENTION

Many couples fight over control of their television's remote control. The present invention features an arm accessory device for holding a remote control. The device fits onto a user's hand, wrist, and forearm. A pocket on the device is sized to accommodate the remote control. The device helps ensure that the remote control is accessible at all times and is safe from misplacement. The device also allows a user's hands to remain free while maintaining control of the remote control.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 is a perspective view of the arm accessory device of the present invention.

FIG. 2 is a side view of the arm accessory device of the present invention

DESCRIPTION OF PREFERRED EMBODIMENTS

Referring now to FIGS. 1-5, the present invention features an arm accessory device 100 for holding a remote control 101. The device 100 fits onto a user's hand, wrist, and forearm 102. A pocket 140 on the device 100 is sized to accommodate the remote control 101. The device 100 helps ensure that the remote control 101 is accessible at all times and is safe from misplacement. The device 100 also allows a user's hands to remain free while maintaining control of the remote control 101.

Figure 3:
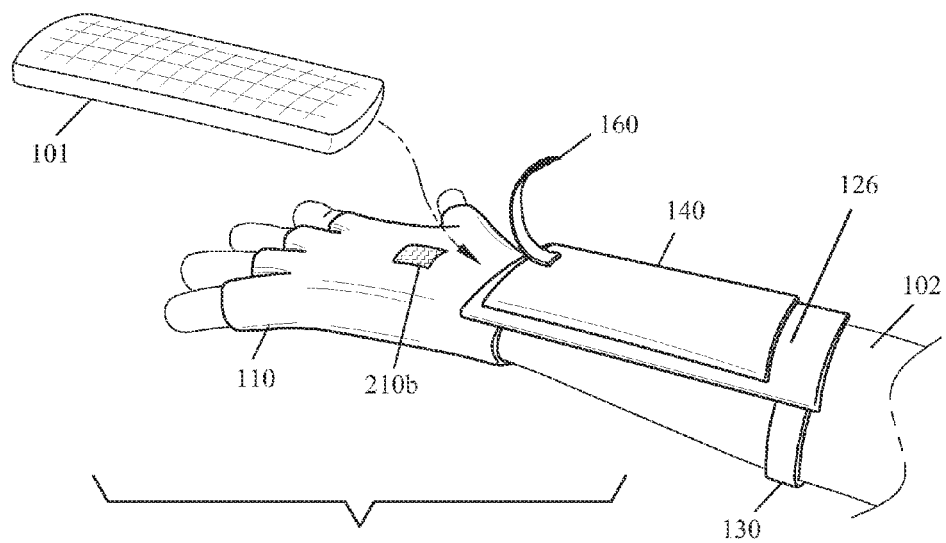
FIG. 3 is a first in-use view of the arm accessory device of the present invention.
Figure 4:
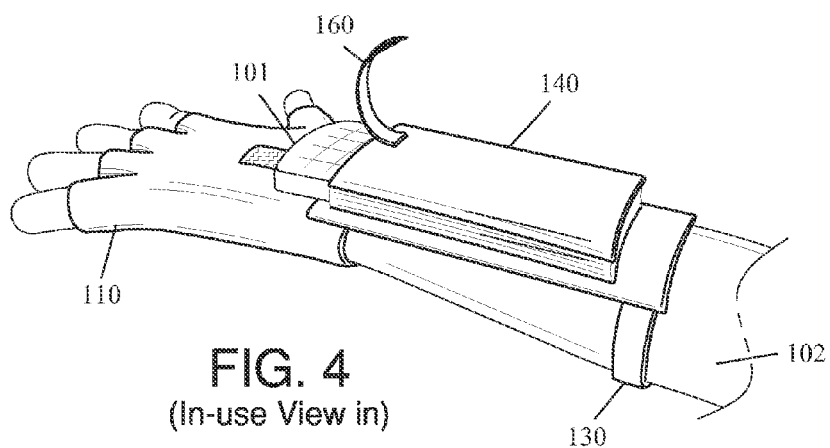
FIG. 4 is a second in-use view of the arm accessory device of the present invention.
Figure 5:
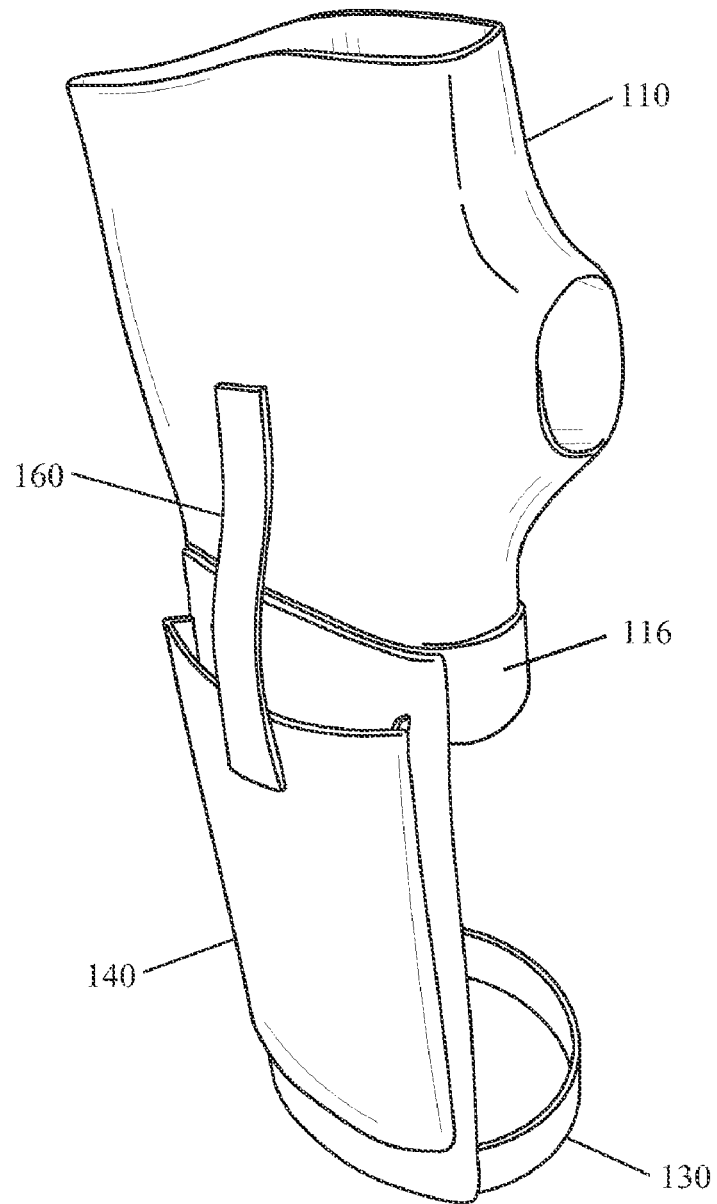
FIG. 5 is a perspective view of an alternative embodiment of the arm accessory device of the present invention.

The arm accessory device 100 comprises a glove base 110 for covering or wrapping around a user's hand. In some embodiments, the glove base 110 resembles a standard glove or a standard mitten. Gloves and mittens are well known to one of ordinary skill in the art. In some embodiments, the glove base 110 comprises fingers 118. The fingers 118 may be full length or cropped (e.g., knuckle-length). The glove base 110 is not limited to the aforementioned designs. For example, as shown in FIG. 5, the glove base 110 may lack fingers 118.

Generally the glove base 110 has a front surface 114 for covering a portion of the dorsal surface of a user's hand, a back surface 115 for covering a portion of the palmar surface of the user's hand, and a bottom edge 116 for wrapping around a portion of the user's wrist. In some embodiments, the bottom edge 116 of the glove base 110 is constructed from a material comprising elastic (e.g., an elastic wristband).

The device 100 (e.g., glove base 110) may be constructed from a variety of materials. For example, in some embodiments, the device 100 (e.g., glove base 110) may be constructed from a material comprising leather, cotton, linen, neoprene, plastic, suede, the like, or a combination thereof.

The device 100 further comprises an extension panel 120. The extension panel 120 has a first end 121 connected to the glove base 110 and a second end 122 extending downwardly from the bottom edge 116 of the glove base 110. The extension panel 120 is adapted to cover a portion of the anterior side of the user's forearm.

A securing means 130 is disposed on the extension panel 120 at or near the second end 122 of the extension panel 120. The securing means 130 functions to secure the second end 122 of the extension panel 120 to the user's forearm (e.g., to prevent the extension panel 120 from flapping). In some embodiments, the securing means 130 is a first strap. In some embodiments, the first strap comprises a first attachment means 210a adapted to secure the first strap around the user's forearm. The first attachment means 210a may include but is not limited to a hook-and-loop fastener mechanism, a snap mechanism, a magnet mechanism, a tie mechanism, a button mechanism, a clasp mechanism, the like or a combination thereof. In some embodiments, the first strap is constructed from a material comprising elastic.

A pocket 140 (for holding the remote control 101) is disposed on an outer surface 126 of the extension panel 120. The pocket 140 has an opening 145. The opening 145 may face the glove base 110. A closing means is engaged with the pocket 140. The closing means can move between at least an open or a closed position respectively allowing and preventing access to the pocket 140 via the opening 145. In some embodiments, the closing means is a strap 160 having a first end 161 and a second end 162, wherein the first end 161 is attached to the pocket 140 and the second end 162 is removably attachable to the glove base 110 via a second attachment means 210b. In some embodiments, the second attachment means 210b is a hook-and-loop fastener mechanism, a snap mechanism, a magnet mechanism, a tie mechanism, a button mechanism, a clasp mechanism, or a combination thereof.

The device 100 of the present invention may be constructed in right-hand versions and left-handed version. In some embodiments, the device 100 is constructed as a single unit piece. However, the present invention is not limited to a one-piece unit.

Without wishing to limit the present invention to any theory or mechanism, it is believed that the present invention is advantageous because the pocket 140 on the extension panel 120 provides a user with the ability to use his/her hands as needed. The glove base 110 helps provide a secure fit.

As used herein, the term "about" refers to plus or minus 10% of the referenced number. For example, an embodiment wherein the device is about 10 inches in length includes a device that is between 9 and 11 inches in length.

The disclosures of the following U.S. patents are incorporated in their entirety by reference herein: U.S. Pat. No. 4,414,692; U.S. Pat. No. 5,038,144; U.S. Pat. No. 5,309,328; U.S. Design Pat. No. D374,767; U.S. Pat. No. 6,473,023; U.S. Pat. No. 7,334,711; U.S. Pat. Application No. 2002/0171559; U.S. Pat. Application No. 2004/0226075; U.S. Pat. Application No. 2007/0083979; U.S. Pat. Application No. 2008/0084390.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An arm accessory device 100 comprising:
   (a) a glove base 110 having a front surface 114 for covering a portion of a dorsal surface of a user's hand, a back surface 115 for covering a portion of a palmar surface of the user's hand and a bottom edge 116 for wrapping around a portion of the user's wrist;
   b) an extension panel 120 having a first end 121 connected to the glove base 110 and a second end 122 extending downwardly from the bottom edge 116 of the glove base 110, the extension panel 120 is adapted to cover a portion of an anterior side of the user's forearm;
   (c) a securing means 130 disposed on the extension panel 120 at or near the second end 122, the securing means 130 functions to secure the second end 122 of the extension panel 120 to the user's forearm;
   (d) a pocket 140 disposed on an outer surface 126 of the extension panel 120, the pocket 140 has an opening 145;
   (e) a closing means engaged with the pocket 140, the closing means can move between an open or a closed position respectively allowing and preventing access to the pocket 140 via the opening 145; and
   wherein the closing means is a strap 160 having a first end 161 and a second end 162, the first end 161 being attached to the pocket 140 and the second end 162 removably attachable to the glove base 110 via a second attachment means 210*b*.

2. The device of claim 1, wherein the second attachment means 210*b* is a hook-and-loop fastener mechanism, a snap mechanism, a magnet mechanism, a tie mechanism, a button mechanism, a clasp mechanism, or a combination thereof.

* * * * *